(12) United States Patent
Hayes et al.

(10) Patent No.: US 6,480,586 B1
(45) Date of Patent: Nov. 12, 2002

(54) REMOTE INITIATION OF COMMUNICATIONS FOR CONTROL OF MULTIPLE APPLIANCES BY TELEPHONE LINE

(75) Inventors: Steven Hayes, San Jose, CA (US); Alan McReynolds, San Jose, CA (US)

(73) Assignee: Genesis Engineering, Inc., San Jose, CA (US)

( * ) Notice: Subject to any disclaimer, the term of this patent is extended or adjusted under 35 U.S.C. 154(b) by 93 days.

(21) Appl. No.: 09/624,838

(22) Filed: Jul. 25, 2000

(51) Int. Cl.[7] .............................................. H04M 11/00
(52) U.S. Cl. ........................ 379/102.02; 379/102.05; 379/106.01
(58) Field of Search ............... 379/102.01, 102.02, 379/102.03, 102.04, 102.05, 102.06, 102.07, 106.01, 106.02, 142.01, 142.04, 142.06, 142.07, 142.17; 340/825.69, 825.72; 709/223

(56) References Cited

U.S. PATENT DOCUMENTS

| | | |
|---|---|---|
| 3,783,193 A | 1/1974 | Lee |
| 3,876,836 A | 4/1975 | Langan |
| 4,121,053 A | 10/1978 | Dick |
| 4,146,754 A | 3/1979 | Rose |
| 4,442,319 A | 4/1984 | Treidl |
| 5,127,045 A | 6/1992 | Cagun et al. |
| 5,379,341 A | 1/1995 | Wan |
| 5,414,756 A | 5/1995 | Levine |
| 5,548,635 A | 8/1996 | Bradley et al. |
| 6,021,324 A | 2/2000 | Sizer, II et al. |

FOREIGN PATENT DOCUMENTS

EP   0917052 A   *   5/1999   ............. G06F/9/44

OTHER PUBLICATIONS

Mizuno et al.; Control of Remote Devices Using HTTP Protocol; May 22, 1997.*

* cited by examiner

Primary Examiner—Melur. Ramakrishnaiah
(74) Attorney, Agent, or Firm—Thomas W. Cook

(57) ABSTRACT

To control multiple electronic devices in homes and other buildings through telephone lines, a user may establish communication by utilizing Caller ID supplied by a local telephone service supplier and, where such Caller ID service is unavailable, user generated Caller ID tones and simultaneous FAX pilot tones and data transmission, to signal to a device to be controlled or to a receiving station that instructions are received and communication is required.

4 Claims, 4 Drawing Sheets

REMOTE INITIATION OF COMMUNICATIONS FOR CONTROL OF MULTIPLE APPLIANCES BY TELEPHONE LINE

TECHNICAL FIELD OF THE INVENTION

The present invention relates to the control of electronic devices in homes and other buildings. More particularly, the present invention relates to a new process for communicating by computer with capable (or "smart") appliances through telephone lines, whereby a user may establish such communication with multiple smart appliances on a single telephone line, and at the same time share such telephone line with other automatic answering devices, such as computer-modems, "fax" machines, and voice mail.

BACKGROUND ART OF THE INVENTION

In recent years, controls for lighting and other electronic devices have begun to appear in a variety of forms. Examples of such controls include timers and switches within individual electronic devices manufactured to allow the user to perform new tasks, such as recording broadcast entertainment on video tape at a time chosen by the user, but without the presence of the user. Such devices or equipment is "capable" or "smart," in the sense that it performs functions independently of a user, or "automatically," once a set of instructions has been supplied to the device, whether the instructions are embedded within the device in the form of computer chips, or supplied after manufacture in the form of software programming.

In conjunction with such controls, and particularly remote control, systems have been developed for remote or distributed control of processes through communications links. Simple examples of remote control communications links include now commonly available, hand-held remote controllers for the control of entertainment equipment by infrared light. However, in recent years the remote control of equipment has become much more flexible, capable, and sophisticated, as computers and communications technology in combination has allowed users to access and control smart devices in ways not previously possible. In response to these developments, appliance manufacturers are building new capabilities into devices which have not previously been controllable.

Accordingly, a user may now find in the market a variety of system systems for remote and automatic control of home and building appliances, many of which are or utilize communications "networks." Some of these systems have an architecture which consists of a centralized "Master" computer to which multiple "Slave" units are connected. The processing power of these "Master-Slave" systems resides in the centralized computer, which interfaces with "dumb" terminals and devices, and to the world outside itself through telephone lines or other communications means. Other system architectures consist of "distributed" systems, consisting of systems in which capable "Client" processors are connected to a centralized "Server" processor, which contains data and additional processing power. The Server in such a "Client-Server" system communicates with the Clients a mixture of data and instructions. Distributed systems may also consist of systems in which the remotely located Clients are connected to each other as well as the centralized Server. Such distributed systems are commonly used in industrial controls, where a plurality of "remote" (i.e., Client) process control units are connected to various controlled devices and sensors, and to a Server, and often communicate with one another, and to the outside world, through a communications link, such as a serial bus or telephone line, which transmits data in a single stream of "bits." Masters and Servers are also known as "Hosts," or "Host Computers."

Communications between components of a system, whereby components may interoperate or coact, may take place by a variety of means. Thus, communications may be accomplished by high and low voltage hard-wire electrical connections, romex, twisted pair, coaxial, fiber optic, and telephone cables and lines, or communications may be accomplished by radio, infrared, microwave, and other electromagnetic radiation. Finally, each component of the system must issue and recognize (and eventually respond to) the same or similar instructions, and the same form of commands (i.e., the same "language" or protocol).

If "remote" locations includes only those locations which reside within a system operated by a single user, a manufacturer may utilize one of a number of alternatives to uniquely address individual components within the system. When the system is so controlled, a user may, for instance, gather information and control equipment by using dedicated lines, or means equivalent to dedicated lines, such as radio transponders.

A "dedicated line" is one in which a signal is detected, and automatically answered, by an appliance or device, and where there is no other device connected to the line that would automatically answer. With a dedicated line, a Host dials the appliance, a modem-handshake occurs, and a security verification usually follows. Dedicated lines have been used in a variety of systems, however the cost and complexity of dedicated lines becomes quickly prohibitive as a system increases in size. As to other means, such as radio, appropriate identification and coding may be available to establish connections among many components, however radio suffers from attenuation over long distances, and significant frequency, bandwith, and repeater limitations. While these solutions are technically feasible, they are not cost effective when the remote device is very inexpensive, such as in residential housing, where the device might be a $10 smoke detector or inexpensive lighting controller.

Uniquely addressing individual components of a system becomes more difficult for users geographically removed from the system they control, particularly if the user wishes to move the means for control, the Host, outside the commonly-controlled portions of the system or network (for instance, outside a "Local Area Network" or LAN), or if the user simply wishes an alternative to first accessing another controller, sub-controller, or gateway computer or modem within the controlled system in order to gather data or control equipment. As the distance over which a user may wish to gather data or control equipment increases, so does the "problem" of addressing individual components within the controlled network increase, as it is not cost effective for each device to have its own dedicated phone line or radio transponder. Even if only one such device or appliance exists at a facility, that device will often share phone line access with computer modems, answering machines, FAX machines, voice mail, and other phone-responsive equipment. Any one of these other devices might also answer an incoming call and foil the data connection intended by the user as he queries the remote location for information, or as he attempts to control the remote device. The problem is perhaps most acute when attempting to gather information from remote devices, or when attempting to control such devices, through the largest network yet developed, i.e., the global computer network, or "internet." A user may remain connected to the internet as a whole through digital subscriber telephone lines (DSL) and by other means, however a user cannot, with technology existing today, remain connected to individual appliances and devices to uniquely address each such device, that is, maintain a "persistent connection" to individual devices. Without a persistent connection, a user must establish a connection each time a component of a system is to be controlled or queried for information. A user cannot gather the desired data or issue the device-specific control command, unless the user first establishes a connection with that device.

Initiation of a communication to a Host by a remote device is relatively straight-forward. When the application requires communication at preset times, or when the application is initiated by a condition at the remote location, the remote device initiates a connection, usually via a dial-up phone circuit, to the Host computer. However, when the decision to initiate a connection originates at the Host, the problem can be more complex, in part because the signal initiated by the Host must be directed to, and received by, an individual device or appliance.

This problem is encountered regardless of the architecture of the system or network, the means used to communicate, the instructions issued, or the protocol. Thus, the problem of establishing an appropriate connection is common to all control systems, and to data gathering initiated by the Host or user. In all such systems, the problem of establishing a connection with a component of the system in which communications is not constantly maintained must be overcome. In such systems a user must initiate a data connection or other remote control function whenever the user (or the user's equipment, whether operating manually or automatically) wishes to gather data from remote locations, or control equipment or devices at remote locations. With the openly accessible nature of the internet, and the concern that only a designated individual user be capable of gathering data or controlling appliances at a designated facility, these functions are particularly acute when using the internet. Moreover, any solution to establishing connections over the internet must utilize telephonic communications techniques, and be compatible with the way in which telephone equipment and lines operates.

A number of schemes have been devised to establish connections between a controlling component and a controlled component within a system or network using telephonic equipment. Such schemes, employing telephone lines in combination with other equipment, usually utilize apparatus to produce ringing signals, or series of such signals, in combination with remote devices capable of detecting and responding to such signals. Various designs and configurations for such schemes include:

U.S. Pat. No. 3,783,193 to Lee, which discloses an apparatus for activating a remotely located device in response to the ringing of a called telephone subscriber station.

U.S. Pat. No. 3,876,836 to Langan, which discloses a remote control system utilizing telephone rings as orders.

U.S. Pat. No. 4,121,053 to Dick, which discloses a telephone command apparatus utilizing a two-tone system.

U.S. Pat. No. 4,146,754 to Rose, which discloses a telephone signaling method and apparatus.

U.S. Pat. No. 4,442,319 to Treidl, which discloses a telephone accessible appliance control system.

U.S. Pat. No. 4,656,655 to Hashimoto, which discloses a telephone accessible appliance control system.

U.S. Pat. No. 5,127,045 to Cragun et al., which discloses an identifying telephone controller system using alternating current lines accessible by telephone, and a dual tone multiple frequency encoder and decoder module.

U.S. Pat. No. 5,379,341 to Wan, which discloses a device for remotely resetting electronic appliances in response to coded telephone rings.

U.S. Pat. No. 5,414,756 to Levine, which discloses a method for telephonically programming an apparatus on a dedicated line using initialization parameters.

U.S. Pat. No. 5,548,635 to Bradley et al., which discloses a system for controlling equipment within a telephone subscriber's premises using dual-tone multi-frequency telephone tones.

U.S. Pat. No. 6,021,324 to Sizer, II et al., which discloses a system and apparatus for controlling an appliance using dual-tone multi-frequency telephone tones.

While the inventions disclosed in these prior patents fulfill their respective objectives, these prior patents do not describe or suggest a method or system which does not utilize coded-ringing schemes to communicate, or initiate a connection between a user or Host and an appliance or other controlled device, wherein only the device selected by the user or Host responds to the initiating signal from the Host. These prior coded-ringing methods of the prior art are slow, as they require time merely to perform rings sufficient to impart significant information to accomplish a task and, largely because of such slowness, these methods are limited in the kinds of information which may be transmitted, and the tasks which may be performed. Further, the prior art is error prone, as there is generally no acknowledgment from a controlled device, and errors in signaling result where voice mail and call forwarding are on the same line. Using the method of the present invention, on the other hand, a user may quickly query multiple remote devices for information telephonically, or control such devices, without error, even when such devices share a line with other phone-responsive equipment. Nor do prior inventions except for coded-ringing methods disclose any system by which commands may be received by a remote device while the device remains in the "on hook" condition; no prior invention allows such control of multiple devices in the telephonic context. Finally, no prior inventions disclose any system of control which utilizes known and commonly available telephone caller identification technology.

In this respect, the control system of the present invention substantially departs from pre-existing designs of the prior art, and in so doing provides the user with a means for accomplishing a user-initiated communication with specific appliances and other devices. By using the invention disclosed herein, users gain the highly desirable ability to initiate such connections, and thereby address specific pieces of equipment, using standard telephone lines shared by other phone-responsive equipment, thereby avoiding the problems of operating a persistent connection system, and at the same time avoiding the problems inherent in making connections with remote devices by issuing a pattern of telephone rings.

DISCLOSURE OF INVENTION

Summary of the Invention

The present invention overcomes the problems and disadvantages of the prior art by utilizing "caller identification" technology and, where caller identification service is unavailable, such caller identification technology in combination with voice band and other sound signals.

"Caller identification" is a scheme of signals utilized by telephone companies to provide information to a called party about a calling party. As presently implemented, caller identification may consist of one or more sound signals, generally in a range audible to a human, delivered by a local (to the called party) telephone company. The sound signals are transmitted to the called party during the "ringing" interval of the called party's telephone receiver, and generally between the first and second "rings" supplied by the local telephone company to that receiver. The local telephone company alerts the called party through such rings that a communication is being requested. Accordingly, the ringing signal is comprised of high voltage, low frequency signals intended to activate the ringer of such receiver. The caller identification information signal, on the other hand, is not intended to activate a ringer, nor be audible at all in the usual course of a call. Accordingly, a low-voltage, higher-pitched, coded signal is transmitted by the telephone company during the ringing interval, before the called party answers the telephone, between the first and second rings of the called party's receiver. The called party's receiver remains "on-hook'" prior to the receiving party picking up his or her receiver, during which time the caller identification signal is transmitted by the telephone company to the receiver of the called party.

The caller identification signal may consist of packets of information of many types of data (using present coding techniques and technology). However, in the U.S. only two such types of data are widely used in caller identification operation, i.e. the identity of the caller and his or her telephone number. When the called party in the U.S. receives packets of information containing these data types, the receiver of the called party then de-codes the information contained in the data packets and, as presently implemented, informs the called party of the name of the calling party and his or her telephone number, generally by display on a screen constructed for this purpose, or by audible tone, or both.

While caller identification in the U.S. presently uses only a limited number of types of data to provide information to the called party, and while caller identification as presently implemented utilizes tones generally in a range audible to a human, and while caller identification utilizes certain schemes in which code information for transmission, caller identification could be implemented by providing many types of information about the caller, using sounds in any range, including digital means without tones, and it could code information in any fashion. In the present invention, "Caller ID" is defined as caller identification as it could possibly be implemented, with such multiple types of information, using any sound, and in any coding scheme. Caller ID is therefore any information which may be sent over telephone lines for control or informational purposes, which information may be detected by equipment in an "on hook" condition. Accordingly, the present invention is not tied to, or limited, by specific packet types or specific packet numbers, and the present invention may therefore provide telephone numbers, caller locations, or any similarly coded data. By such broad definition, "Caller ID" also includes caller identification as it is presently implemented in the U.S. and elsewhere.

In the present invention, a user initiates a connection to a remote "smart" appliance or device, and thereafter provides control to, or gains information from, that appliance or device. When Caller ID service is available from the local telephone service supplier, the Calling Station simply places the call utilizing a pre-determined telephone number (i.e., a number which will be recognized by an intended recipient device). The "outbound" call so placed therefore carries a piece of information, i.e. the telephone number so pre-determined, to any intended recipient appliance or device. The Calling Station may be located as close to the intended recipient appliance or other controlled device as the next "node" in a network, or it may be located as far from the intended recipient appliance or other controlled device as across the world. Whatever the position, a user may directly connect telephonically to an appliance or controlled device, or the user may utilize an internet browser or other communications program to connect to the controlled device through an Internet "web server," a gateway modem, an appliance server, another Host, or through other similar communications equipment (the user and all such intermediary equipment hereafter the "Calling Station").

The means by which the various communications components are connected may vary. Thus, communications may be accomplished by high and low voltage hard-wire electrical connections, romex, twisted pair, coaxial, fiber optic, and telephone cables and lines, or communications may be accomplished by radio, infrared, microwave, and other electromagnetic radiation. However, it is envisioned that most such communications should take place by standard telephone lines, as such lines are commonly used in appliance control systems, are inexpensive, and are consistent with and compatible with other lines used for voice and data communications. Communications by such lines generally suffers less interference from shared uses, such as power lines, and more reliably carries a clear message longer distances.

The present invention also utilizes a Caller ID modem and electronic facsimile ("FAX") equipment at the recipient remote "smart" appliance or device to be controlled, or at a server or capable "Appliance Gateway" proximate to the intended recipient device (the appliance or controlled device and the Appliance Gateway, if present, collectively the "Receiving Station"). The active or smart components of the Receiving Station detect signals transmitted by the Calling Station in its effort to reach the remote appliance or device. The Receiving Station may thereby detect pre-determined telephone numbers or other information received from the Calling Station. Moreover, since detection of a telephone number utilizing Caller ID technology takes place prior to the time the "receiver" of a station "picks up," the detection of such number (and, potentially, the comparison of such number with a list of numbers within the appliance or appliance modem), may all take place in the "on-hook" condition. That is, the Receiving Station, in receiving an enquiry or command from a Calling Station using the present invention, may determine that an "inbound" call matches one of a number of "correct," pre-determined numbers. The Receiving Station may then use the identity of the Calling Station for some useful function, and in consequence the Receiving Station may take some action, such as arming an alarm, operating lights, or changing a thermostat setting. In one such identification and responsive activity situation, the Receiving Station may, in response to the receipt of the pre-determined number, cause an appliance or device to enter a timing sequence that originates an outbound call from the remote appliance or device to the Calling Station, or to another Host or gateway modem.

Using the system of the present invention, a user may activate a specific appliance or device, or inquire of its status or secure other information, as only the appliance intended to be affected responds to the incoming call; only the appliance being addressed recognizes the unique telephone number being carried by the Caller ID transmission. Accordingly, call diverting methods used by telephone companies, such as call forwarding and voice mail, will also carry the Caller ID-transmitted unique telephone number to the selected appliance or device intended by the user even though the call is otherwise directed.

Where Caller ID service is not available from a telephone service supplier, the present invention may still be utilized to query or control a remote appliance or device. In such situation, a Calling Station initiates a connection to a Receiving Station utilizing Caller ID tones, or facsimile transmission ("FAX") tones. The Calling Station at the same time listens as the telephone system creates ringing signals in the remote line which is connected to the recipient Receiving Station.

In the simple case, the Receiving Station picks up the active line first, thereby making a full "voice" connection (i.e., the Calling Station and Receiving Station each go "off-hook") before any other device connected to the same line picks up. In such case, the Receiving Station then generally completes a security verification and grants access, and the Calling Station may then provide information necessary to query the status of the device, or provide control codes necessary to activate the appliance or device.

In the less simple case, another device on the same line as the Receiving Station, such as an answering machine, picks up the line before the Receiving Station can pick up the line. In such case, a second method is utilized to establish connection between the Calling Station and the Receiving Station. When another device on the same line as the Receiving Station picks up the line before the Receiving Station, the Receiving Station uses its Caller ID hardware to detect the Caller ID signal or FAX signal sent by the Calling Station. The Caller ID or FAX signals. may be coded to carry information necessary to induce the Receiving Station to respond to the signal of the Calling Station by then initiating a call to the Calling Station, either soon after receipt of the Calling Station signal, or after a planned delay. Once communication is established between the Calling Station and the Receiving Station, after the Receiving Station places its responsive call to the Calling Station, the Receiving Station then again may complete a security verification and grant access. Where the Receiving Station places a call in direct response to call initiation by the Calling Station, the Calling Station may also then provide information or control codes immediately, security being a lesser issue in such case.

Except in the case where the Receiving Station answers a call before any other equipment on the same line (there being no Caller ID present), the Receiving Station does not go "off hook" during the portion of the sequence during which the Calling Station is attempting to communicate with the Receiving Station. Instead, the "off hook" condition only occurs after the Receiving Station has received sufficient information to identify the Calling Station telephone number by use of Caller ID or fax tones in the "on hook" condition. Upon receipt of such information, the Receiving Station then responds by placing a call to the Calling Station at the telephone number so identified, thereby creating a condition where the Calling Station may pick up the line (i.e., go "off hook"), after which the Calling Station and Receiving station may provide the appropriate modem-handshake, and a productive communication session may begin.

Utilizing the present invention, the Calling Station may, in addition to transmitting its own number or location, also transmit to the Receiving Station information specific to one smart appliance or device, thereby uniquely addressing an individual appliance. Utilizing such individualized addressing techniques, selected appliances may be induced to respond by placing calls at separate or predetermined times. With such individualized addressing techniques, selected appliances may also be induced to respond to control codes necessary to activate the appliance or device by changing their own settings, such as in the case of a thermostat or lock, communicate with equipment other than the Calling Station, or otherwise respond as directed by the Calling Station.

Whether the Receiving Station picks up the line first, before another device on the common communications line, or second, after such other device, however, the Receiving Station does not go off hook except to establish a productive session in which information is transmitted between Calling Station and Receiving Station. As a result, no telecommunication charges are incurred unless such a productive session is established and, in many cases (including the case where the Calling Station transmits its own number and information specific to one smart appliance or device, thereby uniquely addressing an individual appliance), the Receiving Station may never go "off hook." All information in many cases of control of, or information gathering from, an appliance or controlled device may be transmitted between the Calling Station and the Receiving Station when the Receiving Station is in the "on hook" condition. Utilizing individualized addressing techniques in the present invention, and in most cases with such techniques, the user or Calling Station may control a specific appliance, or a number of appliances, without ever incurring telephone communication charges.

Absent Caller ID service supplied by a telephone service supplier, enquiries about the status of the appliance or smart device cannot be transmitted while the Receiving Staition is in the "on hook" condition with the present invention. The Receiving Station can only listen to the Caller ID or FAX signals during the initial transmission from the Calling Station. However, the Calling Station may issue a control code to induce a responsive status information call to the Calling Station soon after call initiation by the Calling Station, or after the appliance or device has accomplished one or more tasks, gathered information from other devices, or otherwise acted as directed by the Calling Station during the Calling Station's initial "on hook" calling sequence.

Moreover, absent Caller ID service from the telephone service supplier, the present invention may not generally be utilized with "call forwarding," as the invention relies upon signaling that is not present, or may be redirected, with call forwarding. Finally, absent Caller ID service, the present invention also requires adjustment in the presence of voice mail, as voice mail also relies on voice band signaling which may interfere with the transmissions of the Calling Station. Such adjustments may include limiting the information received by the Receiving Station to that information received prior to first pickup by any device on the common line, limiting such information to the Calling Station telephone number identifying information, or otherwise reducing the duration or character of information received by the Receiving Station if voice mail is present. However, it may be appreciated that the present invention holds advantages not found in any other existing control methods of the prior art, as the invention operates well in the presence of answering machines, computer modems, FAX machines, and other equipment, wherever Caller ID service from the telephone service supplier is available.

OBJECTS OF THE INVENTION

A principal object of the present invention is to present a system in which a user may activate an appliance or other controlled device, or inquire of its status, or secure other information, utilizing caller identification technology, and Caller ID as herein more broadly defined, as a Receiving Station, including the appliance intended to be affected, having Caller ID capability, responds to an incoming call initiated by a Calling Station, which call carries a unique telephone number utilizing the Caller ID transmission, to thereby induce the appliance to provide information or take some action.

A further principal object of the present invention is to activate a specific smart appliance or device, utilizing Caller ID technology, thereby inducing selected appliances to respond by placing calls at separate or predetermined times.

A further object of the present invention is to utilize individualized addressing techniques, so that a Calling Station may control a specific appliance, or a number of appliances, without incurring telephone communication charges until a productive session is established.

A further object of the present invention is to utilize Caller ID and FAX tones, so that a Calling Station may control a specific appliance, or a number of appliances, without, in some cases, ever incurring telephone communication charges.

A further object of the present invention is to allow a user or Calling Station to control a remote Receiving Station utilizing Caller ID technology even in the absence of Caller ID service supplied by a telephone service supplier.

BRIEF DESCRIPTION OF DRAWINGS

The accompanying drawings, which are incorporated in and constitute a part of this specification, illustrate one embodiment of the present invention and, together with the description, serve to explain the principles of the invention.

DESCRIPTION OF A PREFERRED EMBODIMENT

Figure 1:
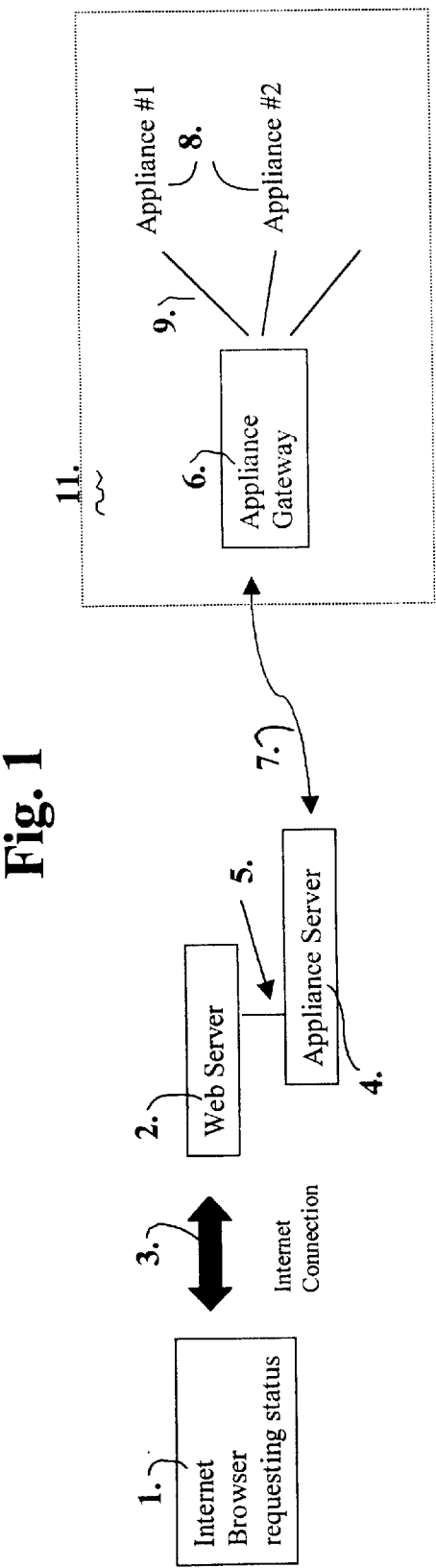
FIG. 1 is a schematic block diagram of an exemplary control system of the present invention, including a Calling Station internet browser, a plurality of remote appliances to be controlled, and communication nodes and cabling necessary to establish a communications link between its endpoints.

Referring initially to FIG. 1, one variation on the new control System of the present invention is shown in schematic form. In FIG. 1, Internet browser 1 may be connected to web server 2 by communications link 3. Internet browser 1 may then be utilized to initiate a call to web server 2, and thereby transmit a signal carrying information or instructions to web server 2 and beyond.

As noted herein, a user may utilize any means to fill the function of Internet browser 1 which meets the need to initiate contact with controlled devices. Accordingly, any Host computer (not shown) may initiate a call to a remote location or, as in the case of FIG. 1, an Internet browser may initiate such a call to a remote location. Similarly, the user may utilize a telephone keypad (not shown) from the user's location, or any other means which may accomplish such call initiation to the remote location. Accordingly, any device capable of initiating a call, including, for example, an Internet gateway modem (not shown), a web server, an appliance server, or any other equipment, if such equipment is capable of initiating contact, may act as the Calling Station to initiate a call to a "smart" appliance or device. Further the functions of each of these components as shown in FIG. 1 may be separated as in FIG. 1, or they may be combined on the same computer with suitable software.

Similarly, equipment other than that shown in FIG. 1 may be capable of receiving a call initiated by a Calling Station, and acting in response to such call to activate an appliance or controlled device. Accordingly, the present invention also encompasses cases where a device receives the contact initiated by other equipment, such as when Caller ID, as herein defined, FAX tones, and other audible signals, are received by any device capable of receiving a call, including, for example, an Internet gateway modem (not shown), a web server, an appliance server, the "smart" appliance or controlled device itself, or any other equipment capable of receiving a call. Any device or combination of devices so capable may act as the "Receiving Station" 11 to receive a call placed to a "smart" appliance or device, whether the Receiving Station is a network at the location of the appliance, a discrete "smart" device, or any combination of appliance, controlled devices, network, or other equipment. While communications link 3 is shown in FIG. 1 as an Internet connection, any connecting means capable of carrying a signal may be utilized. Accordingly, standard telephone lines, radio, microwave, fiber optics, and other wave guides may be utilized to carry a signal from Internet browser 1 to web server 2, and from web server 2 on to appliance server 4, and beyond to the device to be controlled.

Continuing with FIG. 1, a contact initiated by Internet browser 1 is detected by web server 2. As such contact is intended for receipt by an appliance or controlled device, web server 2 directs the signal so received to appliance server 4 utilizing connection means 5. Various means may be utilized to carry the signals between components of the system. Thus, high and low voltage hard-wire electrical connections, romex, twisted pair, coaxial, fiber optic, and telephone cables and lines, and other means, are all available to establish a connection, as well as standard telephone lines, radio, microwave, fiber optics, and similar means.

Appliance server 4 then directs the signal so received to Appliance Gateway 6 utilizing phone connection 7. The details of directing the signal received from web server 2 on to Appliance Gateway 6, and specifically the communication between appliance server 4 and Appliance Gateway 6, are set forth more fully below, as the operation of the system is disclosed by reference to FIG. 3 and FIG. 4, and the discussions relating thereto. FIG. 1 shows the connection between appliance server 4 and Appliance Gateway 6 as a "dialup" phone connection, and such connection may be utilized to increase flexibility to the overall system of the present invention, by allowing appliance server 4 and Appliance Gateway 6 to be located either close to one another or distant. However, even where appliance server 4 and Appliance Gateway 6 are located close to one another, the connection between appliance server 4 and Appliance Gateway 6 is intended to utilize telephone technology, however constituted, to overcome the limitations of persistent connections and other prior art.

As Appliance Gateway 6 is always turned on and constantly "listening" for communication from appliance server 4, Appliance Gateway 6 may detect a signal sent by appliance server 4 by phone connection 7. Appliance Gateway 6 then actively "decodes" or interprets the signal so received by the method further set forth more fully below, specifically as the operation of the system is disclosed by reference to FIG. 3, and the discussion relating thereto. The Appliance Gateway 6 extracts from the signal received from the appliance server 4 the information or instructions originally imparted by Internet browser 1 or other Host. Upon such interpretation of the received signal, Appliance Gateway 6 initiates communication with one or more appliances 8 by communications lines 9, in the form of commands designed to activate a function for which such appliances 8 are designed, or cause such appliances 8 to provide information back to Appliance Gateway 6. Such information may include information on the status or settings of one of appliances 8, confirmation such appliances 8 have taken action consistent with the instructions received from Internet browser 1, information on what may have transpired at appliances 8 since the last communication from Internet browser 1, or other information. Finally, as one or more of appliances 8 receives commands from Appliance Gateway 6, appliances 8 respond consistently with the instructions originally contained in the signal from the Internet browser 1, thereby performing the function for which such appliances 8 are designed, or providing information back to Appliance Gateway 6 consistent with such instructions.

Figure 2:
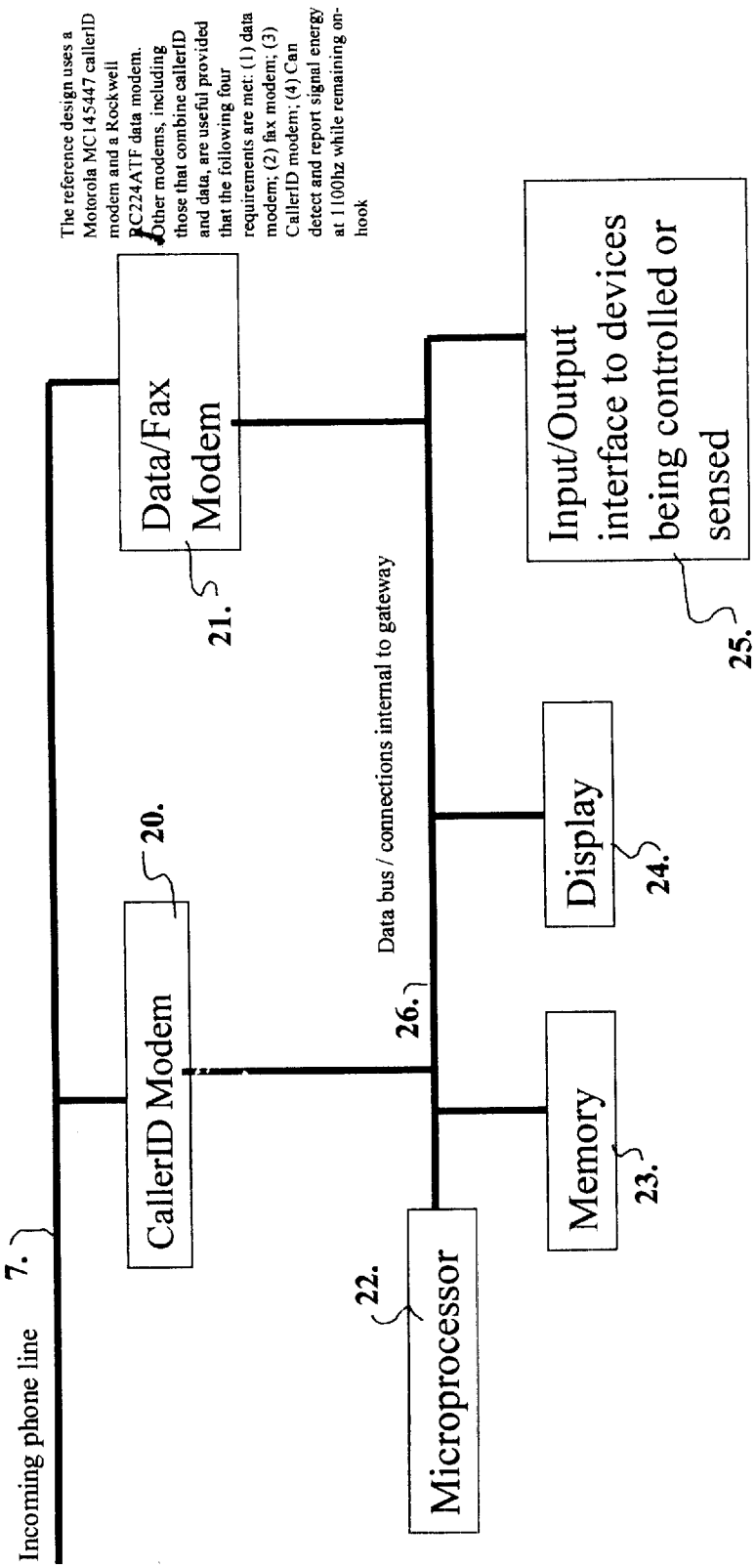
FIG. 2 is a schematic block diagram of an exemplary Appliance Gateway, or Receiving Station, and the components thereof, for connecting appliances or other devices of the present invention to the outside world by standard telephone line.

Referring now to FIG. 2, the hardware of Appliance Gateway 6 of the present invention is shown in greater detail in schematic form. In FIG. 2, incoming phone line 7 connects appliance server 4 to both Caller ID Modem 20 and to Data/FAX Modem 21. Accordingly, signals received by the Appliance Gateway 6, may be received by both Caller ID Modem 20 and Data/FAX Modem 21. Phone line 7 may also be connected with other devices, such as standard telephone receivers (not shown), answering machines (not shown), or other equipment. Appliance Gateway 6 is designed to operate correctly in an environment where such telephone receivers and other equipment are present.

In FIG. 2, a telephone receiver (not shown), or other equipment (not shown), also connected to phone line 7, may be in use, with voice communication in progress, such equipment may be entirely inactive, or the appliance server 4 may be providing a ringing signal. Regardless of all such activity, however, Caller ID Modem 20 and Data/FAX Modem 21 within Appliance Gateway 6 are always turned on and "listening" for signals from appliance server 4, whether phone line 7 is in an "on-hook" condition or in an "off-hook" condition. Accordingly, with all such conditions on phone line 7, Modem 20 and Data/FAX Modem 21 may each receive a signal originated by appliance server 4, and so also receive any information contained in such signal. Whether Caller ID Modem 20 or Data/FAX Modem 21 responds to the signal from appliance server 4, depends on the form of the signal received. Once received, however, the signal from appliance server 4 is interpreted or "decoded" by microprocessor 22, utilizing programming contained in memory 23. The programming of microprocessor 22 and memory 23, further details of which are set forth below in relation to FIG. 3 (i.e., whether in the form of Callier ID or FAX tones), is supplied initially by the manufacturer of Appliance Gateway 6. However, the user of the present invention may vary the settings of (i.e., re-program) Appliance Gateway 6, and thereby affect the functioning of the appliances. Such re-programming may be accomplished by a variety of programming means, such as by keys or keypad on or near the Appliance Gateway 6, in combination with display 24, or by re-programming commands received from Internet browser 1. After the signal from appliance server 4 is interpreted by Appliance Gateway 6, microprocessor 22 within Appliance Gateway 6 initiates communication with one or more appliances 8 to be controlled using appliance interface 25 having input and output means appropriate to communicate with each such appliances 8 over communications lines 9. All components of Appliance Gateway 6 are connected within the Appliance Gateway utilizing standard means, generally by data "bus" 26 or other appropriate connections. The form of the signal received from appliance server 4, its origin at the appliance server 4, and the way the signal is interpreted within Appliance Gateway 6, is further described below in FIG. 3 and FIG. 4, and the discussions relating thereto.

Figure 3:
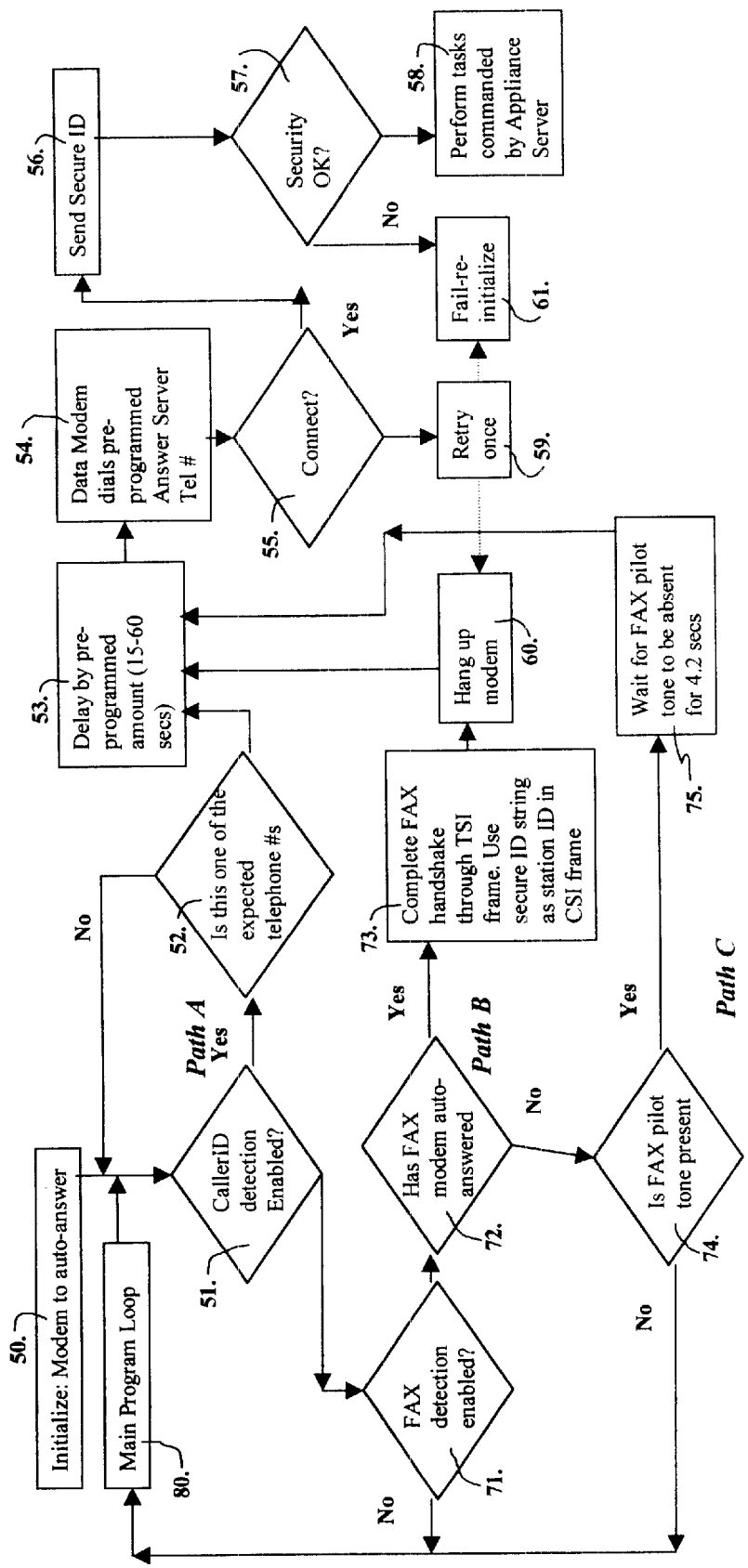
FIG. 3 is a flow chart diagram of the process used by an Appliance Gateway, or Receiving Station, to respond to a communication initiated by a Calling Station.

Referring now to FIG. 3, the process used by an Appliance Gateway, or Receiving Station, to respond to a communication initiated by a Calling Station is illustrated by way of a flow chart diagram. In FIG. 3, the Appliance Gateway 6 is initialized 50 and set by a user to respond to pre-determined Caller ID and FAX signals. In setting the Appliance Gateway, user enters into memory 23 a telephone number or telephone numbers to which Caller ID Modem 20 will respond when Caller ID service is available from the local telephone service supplier. In setting the Appliance Gateway, the user may also, instead or in addition, enter settings which allow the Caller ID Modem 20 to respond to Caller ID tones even when Caller ID service is not available from the local telephone service supplier, and at the same time enter settings which allow the Data/FAX Modem 21 to respond to FAX tones in such environment. Thereafter, the Appliance Gateway 6 listens continuously to incoming phone line 7 for either Caller ID tones or FAX tones.

If Caller ID service is available locally from the telephone service provider, the user may set Appliance Gateway 6 for receipt of local provider Caller ID information, which information currently includes the telephone number of the calling party, or the name of the calling party, or both. In FIG. 3, the functioning of Appliance Gateway 6 when such locally available Caller ID service is available corresponds with "Path A." Upon receipt of a signal from appliance server 4 after initiation 50 of Appliance Gateway 6, Appliance Gateway 6 determines 51 whether Caller ID detection is enabled, consistent with settings entered by the user based on availability of Caller ID from the local telephone service provider. If Caller ID is enabled, Appliance Gateway 6 next determines 52 whether the number contained in the Caller ID signal supplied by the local provider is one of the numbers entered by user while entering settings during initialization 50, and so is an "expected" or "authorized" number. If the number contained in the Caller ID signal matches one of the numbers entered by the user while entering settings during initialization 50, Appliance Gateway 6 then delays further activity a pre-set amount of time 53 before return dialing 54, by Data/FAX Modem 21, appliance server 4. If, upon such dialing, Appliance Gateway 6 determines 55 that a connection is made to appliance server 4. Appliance Gateway 6 then sends identifying information 56 to appliance server 4 to meet the security requirements required by appliance server 4 and Appliance Gateway 6 (as determined by the user during the entry of operational settings in each case). Upon meeting security requirements 57 of Appliance Gateway 6, appliance server 4 transmits commands to Appliance Gateway 6, and Appliance Gateway 6 transmits control commands to one of the appliances 9 to be controlled or queried, consistent with the instructions of the user. As such instructions include a designation of which one of the appliances 9 are to be addressed, and also an instruction to activate or enquire of such one appliance, only the one appliance so addressed responds 58 by performing the tasks called for by appliance server 4 consistent with the instruction issued by Appliance Gateway 6.

It should be noted in the above process that Appliance Gateway 6 only goes "off-hook" when Data/FAX Modem 21 dials 54, and that a "voice" connection is achieved only after appliance server 4 picks up in response to such dialing. As a result, only after Appliance Gateway 6 has determined 52 that the number being transmitted in the Caller ID signal is an expected number, and only after Appliance Gateway 6 has responded by dialing 54 appliance server 4, and appliance server 4 has also gone "off-hook," can the communication initiated by user through Internet browser 1 incur telephone service charges.

The above process represents the straight-forward case where a signal from appliance server 4 results in a connection and consequent initiation of a command to an appropriate appliance 9 in the shortest possible time. However, if in this process Appliance Gateway 6 determines 52 that the number being transmitted in the Caller ID signal is not an expected number, Appliance Gateway 6 returns by main program loop 80 to initialization 50 to await receipt of further signals from appliance server 4. Similarly, if in this process Appliance Gateway 6 determines 55 that a connection with appliance server 4 has not been established on a first try, Appliance Gateway 6 may dial 54 appliance server 4 a second time 59, or may attempt to connect more than twice (not shown). After each such unsuccessful attempt at connecting with appliance server 4, Appliance Gateway 6 discontinues the attempt after a reasonable period of time, hangs up 60 Data/FAX Modem 21, and delays further activity a pre-set amount of time 53 before again initiating a return dial 54 to appliance server 4. Finally, if in this process Appliance Gateway 6 determines 57 that its security criteria are not met after sending security identifying information 56, communication then fails 61, and Appliance Gateway 6 returns by main program loop 80 to initialization 50 to await receipt of further signals from appliance server 4.

Returning to initialization 50 of Appliance Gateway 6 in FIG. 3, a user may determine that local telephone service provider Caller ID is not available, and so disable Caller ID detection. Upon receipt of a signal from appliance server 4 after initiation 50 of Appliance Gateway 6, and Caller ID detection being so disabled, Appliance Gateway 6 determines 71 whether FAX detection has been enabled. This determination is consistent with settings entered by the user, who has determined that Caller ID from the local telephone service provider is not available. In this environment, two possibilities exist where the single phone line 7 is intended to service more than one appliance 8 (or other device to be controlled) and also other telephone-responsive devices (not shown). Firstly, the Data/FAX Modem 21 of Appliance Gateway 6 picks up line 7, thereby going "off-hook," before any other telephone-responsive device on the same line 7 may go "off-hook." This circumstance corresponds with "Path B" in FIG. 3. Secondly, and alternatively, another telephone-responsive device on the same line 7 "picks up" line 7, thereby going "off-hook," before Data/FAX Modem 21 of Appliance Gateway 6 may pick up line 7. This situation corresponds with "Path C" in FIG. 3.

Utilizing Path B, Data/FAX Modem 21 will wait a pre-set number of rings, typically six rings, upon detecting an incoming call, before going "off-hook," to provide sufficient time for other equipment (not shown) on the same line 7 to answer the incoming call. When no other such equipment answers, Data/FAX Modem 21 of Appliance Gateway 6 "picks up" line 7, thereby going "off-hook" (before any other device), Appliance Gateway 6 determines 72 that such action has occurred, and Data/FAX Modem 21 completes "handshake" 73 with the modem (not shown) of appliance server 4. After "handshake" 73 is complete, or during such "handshake," Appliance Gateway 6 receives a coded or secure identification string embed within the Calling Station Identification Frame (CSI Frame) of the FAX communication to securely identify the number of the user, or other identification code. Upon confirming the authority of the user, Appliance Gateway 6 then hangs up 60 Data/FAX Modem 21, and delays further activity a pre-set amount of time 53 before initiating a return dial 54 to appliance server 4.

However, when another telephone-responsive device (not shown) on the same line 7 goes "off-hook" before Data/FAX Modem 21 of Appliance Gateway 6 goes "off-hook," Appliance Gateway 6 determines 72 that such action has occurred, and Data/FAX Modem 21 continues to listen to the incoming call on phone line 7, utilizing Path C, in an attempt to detect the presence of a FAX Pilot Tone issued by appliance server 4. The Fax Pilot Tone may consist of a variety of tones issued by appliance server 4 and received on incoming telephone line 7 by Data/FAX Modem 21. However, a preferred Fax Pilot Tone is comprised of two separate tones near 1100 Hertz, each tone lasting 400 milliseconds to 533 milliseconds. In this preferred signaling scheme, the 1100 Hertz tones are separated by an interval of approximately three seconds duration (2.67 seconds to 3.27 seconds with present telephone equipment). The Fax Pilot Tone signals to Appliance Gateway 6 that a communication has been requested by the user or Host, in the environment where standard telephone service provider Caller ID is not available, and that the Data/FAX Modem 21 has not gone "off-hook" before other equipment (not shown) on the common telephone line 7. If the Fax Pilot Tone is present in the signal received by Appliance Gateway 6, Data/FAX Modem 21 detects its presence 74, waits for the Fax Pilot Tone to cease, and remain absent a period of about 4.2 seconds 75, after which Appliance Gateway 6 delays further activity a pre-set amount of time 53 before initiating a return dial 54 to appliance server 4. It should be noted in the above process that a voice connection is again achieved only after appliance server 4 picks up in response to dial by Appliance Gateway 6, the system at that point going "off-hook" at both ends, at which time telephone service charges begin.

Figure 4:
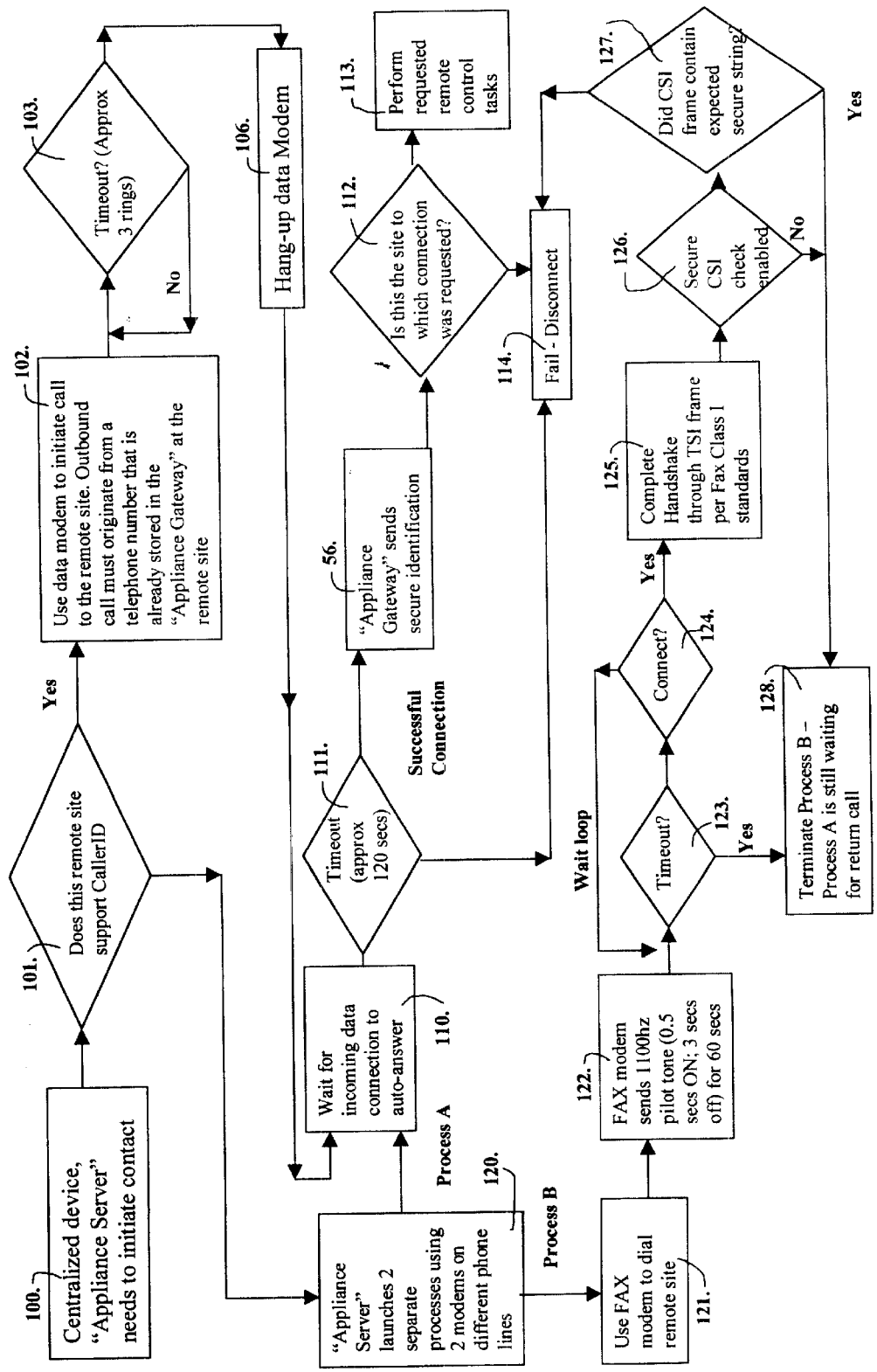
FIG. 4 is a flow chart diagram of the process used by an Appliance Server, or Calling Station, to initiate connection with an appliance or controlled device or Receiving Station.

Referring now to FIG. 4, the process used by a Calling Station to initiate contact with a Receiving Station is illustrated by way of a flow chart diagram. In FIG. 4, appliance server 4 receives a signal from web server 2 via connection means 5, or directly from a user, Host, or Internet browser 1. The signal so received contains the message that the appliance server 4 is to initiate contact 100 with Appliance Gateway 6. Upon receipt of the signal, appliance server 4 first determines 101 whether the Appliance Gateway 6 at the location of the device to be controlled 8 has been set to accommodate Caller ID provided by the local telephone service supplier at that location. The availability of locally provided Caller ID may be indicated at the time the user enters "setup" information about the system. Such setup information may include information about the appliance server 4 and the Appliance Gateway 6 to be addressed by appliance server 4, information on the types and locations of devices to be controlled by Appliance Gateway 6, the availability of locally provided Caller ID, and other information.

If locally provided Caller ID is indicated, appliance server 4 initiates a call 102 ( i.e., goes off-hook to communicate with) Appliance Gateway 6 utilizing its data modem (not shown). Consistent with the capabilities of the system when set to utilize locally provided Caller ID, the outbound call of the appliance server 4 must originate from a telephone number that is already stored in Appliance Gateway 6, so that Appliance Gateway 6 may operate consistent with the process set forth above in FIG. 3. However, if the appliance server 4 and Appliance Gateway 6 are set for operation using locally provided Caller ID, the system may operate without additional information from appliance server 4 as it "rings" Appliance Gateway 6. In such circumstances, appliance server 4 and Appliance Gateway 6 together utilize the capabilities of the locally provided Caller ID to provide all the information necessary for Appliance Gateway 6 to detect the identity and location of the calling party, user, or Host, based on the Caller ID information, and respond by placing a return call to appliance server 4 for instructions (or to supply information). It should be noted at this point that a number of different appliance gateways may be addressed by appliance server 4. As a result, appliances may be controlled or queried at a number of different locations, either proximate or remote, or both. It should also be noted that "smart" appliances may be manufactured capable of performing the functions of an appliance gateway as herein described, thereby allowing an appliance server to control or query an appliance directly, without the necessity of an appliance gateway separate from the controlled appliance.

Upon going "off-hook" and placing a call to Appliance Gateway 6, appliance server 4 in FIG. 4 delays further action in a "timeout" 103 while the locally provided telephone service provider rings the selected Appliance Gateway 6, the timeout typically lasting a period of about three such rings depending on the ringing interval supplied by the telephone service provider. After the timeout has run, appliance server 4 hangs up 106 the data modem and waits 110 for an incoming call, which appliance server 4 may then automatically answer, if such call is received during a preset period of time (not shown). As set forth more fully in relation to FIG. 3., Appliance Gateway 6 cycles through its function upon detecting the call placed 102 by appliance server 4, and Appliance Gateway 6 responds to such call by return dialing 54 appliance server 4. As appliance server 4 is waiting for the return call of Appliance Gateway 6, appliance server 4 picks up the return call of Appliance Gateway 6 (if such call is received within the preset period of time), appliance server 4 and Appliance Gateway 6 complete the connection 55 between them. Both appliance server 4 and Appliance Gateway 6 are thereafter in an "off-hook" condition. It should be noted again that, in the above process, a voice connection is achieved only after appliance server 4 picks up in response to dialing by Appliance Gateway 6, and only when both appliance server 4 and Appliance Gateway 6 go "off-hook" will the communication initiated by user through Internet browser 1 incur telephone service charges.

Continuing with FIG. 4, once the connection between appliance server 4 and Appliance Gateway 6 is complete 55, appliance server 4 delays further action in a second timeout 111 except to actively listen for secure identifying information from Appliance Gateway 6. As Appliance Gateway 6 cycles through its function after completing the connection 55 to appliance server 4, Appliance Gateway 6 responds to completion of the connection between appliance server 4 and Appliance Gateway 6 by sending 56 secure identifying information to appliance server 4 to meet the security requirements required by appliance server 4 and Appliance Gateway 6 (as determined by the user during the entry of operational settings of each device). If the identifying information sent 56 by Appliance Gateway 6 and received by appliance server 4 within timeout 111 indicates that Appliance Gateway 6 is the site to which connection was requested 112, appliance server 4 then forwards control instructions and inquiries received by appliance server 4 to Appliance Gateway 6, thereby activating 113 appliances 8 consistent with the commands of the user at Internet browser 1. Such commands may be sent by the user, Host, or internet browser 1 to appliance server 4 after a complete connection 55 between appliance server 4 and Appliance Gateway 6 is achieved, or with the command by the user, Host, or internet browser 1 to initiate contact 100, or anytime between these points. If the identifying information sent by Appliance Gateway 6 is not received by appliance server 4 within timeout 111, appliance server 4 then disconnects 114, the attempt at communicating control commands to a selected appliance 8 within such timeout is considered "failed."

Appliance server 4 may also receive a signal from web server 2 to initiate contact 100 with Appliance Gateway 6, but upon receipt of the signal, appliance server 4 may determine 101 that the Appliance Gateway 6 at the location of the device to be controlled 8 has not been set to accommodate Caller ID provided by the local telephone service supplier at that location. If locally provided Caller ID is not so indicated, appliance server 4 then initiates 120 a connection to Appliance Gateway 6 by launching two separate processes. While such processes may be combined in some cases, the preferred embodiment herein envisions the two separate processes will utilize two separate modems (not shown) and two separate lines (not shown) which, in combination, may be represented by phone line 7.

In the first such process (Process A), appliance server 4 waits for an incoming call 110, which appliance server 4 may then automatically answer. As Appliance Gateway 6 cycles through its function upon receipt of a suitable signal from appliance server 4, Appliance Gateway 6 responds by dialing 54 appliance server 4. The source of such incoming call is dialing by Appliance Gateway 6, which dials appliance server 4 as a result of the second such process (Process B), which process shall be explained more fully below. However, it may be noted here that, as appliance server 4 picks up the call from Appliance Gateway 6, the connection between appliance server 4 and Appliance Gateway 6 is completed 55, both appliance server 4 and Appliance Gateway 6 are thereafter in an "off-hook" condition. Appliance Gateway 6 may then send identifying information 56 to appliance server 4, and appliance server 4 may then forward control instructions and inquiries to Appliance Gateway 6 (or disconnect 114 in a failed connection) to activate 113 appliances 8 as in the locally supplied Caller ID situation set forth above.

Looking more closely at Process B, appliance server 4 in this second process induces Appliance Gateway 6 to supply suitable signal to appliance server 4 as mentioned in Process A above. In Process B, appliance server 4 uses a FAX modem (not shown) to dial 121 Appliance Gateway 6. That is, appliance server 4 goes off-hook to communicate with Appliance Gateway 6 utilizing a FAX modem and the capabilities of the system when set to operate without locally provided Caller ID. The signal generated by the FAX modem consists, in the preferred embodiment of the present invention, of a FAX Pilot Tone. As noted above, the Fax Pilot Tone may consist of a variety of tones, however the Fax Pilot Tone in the preferred embodiment is comprised of two separate tones near 1100 Hertz, each tone lasting 400 milliseconds to 533 milliseconds. In this preferred signaling scheme, the 1100 Hertz tones are separated by an interval of approximately three seconds duration (2.67 seconds to 3.27 seconds with present telephone equipment).

Referring again to FIG. 4, the appliance server 4 sends 122 the Fax Pilot Tone for about 60 seconds, during which time Appliance Gateway 6 may pick up the line to automatically answer 72, thereby completing the connection 124 between appliance server 4 and Appliance Gateway 6. Thereafter both appliance server 4 and Appliance Gateway 6 are again in an "off-hook" condition, and so may exchange information. However, where Caller ID service is not enabled, appliance server 4 and Appliance Gateway 6 exchange information using existing FAX transmission technology. Using current technology, appliance server 4 and Appliance Gateway 6 may, for instance, exchange information during the TSI frame of a FAX transmission utilizing FAX Class 1 communication standards. During the exchange of information between appliance server 4 and Appliance Gateway 6, appliance server 4 may send to Appliance Gateway 6 secure CSI Frame identifying information, in the form of a "secure string."

Returning to the processes of FIG. 4, when appliance server 4 and Appliance Gateway 6 are connected, a "handshake" is then performed 125 utilizing, for example, FAX Class 1 communication standards. During the handshake, or thereafter, appliance server 4 may transmit the identifying information mentioned above to Appliance Gateway 6 during the TSI frame. Upon receipt of identifying information, Appliance Gateway 6 may check 127 such information for a "secure string" if the secure CSI check is enabled 126. If, upon checking, appliance server 4 determines 127 the CSI frame contains the expected secure string, appliance server 4 then terminates 128 Process B, and waits 110 for a return call 54 from Appliance Gateway 6. If, on the other hands, Appliance Gateway 6 checks 127 for a secure string, and the expected secure string is not received, appliance server 4 then disconnects from Appliance Gateway 6, and the communication is again considered to have failed. However, if Appliance Gateway 6 does not check 127 for a secure string because the secure check is not enabled, appliance server 4 then again terminates 128 Process B, and waits 110 for a return call from Appliance Gateway 6. Finally, if Appliance Gateway 6 does not pick up the line to complete the connection between appliance server 4 and Appliance Gateway 6 during the 60 second (about) duration of the Fax Pilot Tone, appliance server 4 then ceases sending the Fax Pilot Tone, and begins a timeout 123. If no connection is made between the FAX modem of appliance server 4 and the FAX modem 21 of Appliance Gateway 6 within timeout 123, appliance server 4 then again terminates 128 Process B, and waits for a return call from Appliance Gateway 6.

Process A and Process B are combined in the above communication method to produce the desired connection in the absence of locally provided Caller ID. However, It may be noted again that a full connection (i.e., off hook at both ends) is achieved only after appliance server 4 picks up line 7 in response to dialing by Appliance Gateway 6, and only when both appliance server 4 and Appliance Gateway 6 go "off-hook" will the communication initiated by user through Internet browser 1 incur telephone service charges through line 7.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system for electronically controlling remotely located devices, comprising:

an appliance server, having means for receiving electronic signals, the appliance server having a first data modem, for sending Caller ID electronic signals by telephone line, and for sending other data electronic signals by telephone line, the appliance server having a first FAX modem, for sending FAX electronic signals by telephone line, the appliance server having a first memory for storing commands and settings, and the appliance server having a first microprocessor, for operating the appliance server, an appliance gateway, having a Caller ID modem, for receiving Caller ID electronic signals from the appliance server by telephone line, and for receiving Caller ID electronic signals from other sources by telephone line, the appliance gateway having a second data modem, for receiving electronic signals from the appliance server first data modem by telephone line, and for receiving other data electronic signals from the appliance server first data modem by telephone line, the appliance gateway having a second FAX modem, for receiving FAX electronic signals from the appliance server by telephone line, the appliance gateway having a second memory for storing commands and settings, and the appliance gateway having a second microprocessor, for operating the appliance gateway.

2. The system of claim one, further comprising: a display, for determining the status of the apparatus.

3. A system for controlling remotely located devices in which a calling station initiates contact with a receiving station by a plurality of telephone lines, comprising the steps of:

initiating a call to an appliance gateway, if the appliance gateway is set to receive locally-generated Caller ID electronic signals, receiving the call and a locally-generated Caller ID electronic signal at the appliance gateway, interpreting information contained in the Caller ID electronic signal at the appliance gateway, based on the information contained in the Caller ID electronic signal, stimulating the appliance gateway to call back to call initiator, establishing a connection between the call initiator and the appliance gateway as the call initiator picks up the call back from the appliance gateway, generating a FAX pilot tone electronic signal at an appliance server, if the appliance gateway is not set to receive locally-generated Caller ID electronic signals, directing the FAX pilot tone to the appliance gateway, generating a Caller ID electronic signal at the appliance server substantially at the same time as the FAX pilot tone is generated at the appliance server, if the appliance gateway is not set to receive locally-generated Caller ID electronic signals, directing the Caller ID electronic signal to the appliance gateway, receiving the FAX pilot tone electronic signal and the Caller ID electronic signal at the appliance gateway, interpreting information contained in the FAX pilot tone electronic signal and the Caller ID electronic signal at the appliance gateway, based on the information contained in the FAX pilot tone electronic signal and the Caller ID electronic signal, stimulating the appliance gateway to call back to the appliance server, establishing a connection between the appliance server and the appliance gateway as the appliance server picks up the call back from the appliance gateway.

4. The system for controlling remotely located devices of claim 3, further comprising receiving an electronic signal containing instructions at an appliance server prior to generating the Caller ID electronic signal at the appliance server.

* * * * *